(12) United States Patent
Nomura et al.

(10) Patent No.: US 6,342,976 B1
(45) Date of Patent: Jan. 29, 2002

(54) LUMINOUS FLUX DIAMETER VARIABLE TYPE OBJECTIVE LENS AND OPTICAL APPARATUS USING THE SAME

(75) Inventors: Yoshimitsu Nomura; Kaneyoshi Yagi; Masato Kawabata, all of Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/482,356

(22) Filed: Jan. 14, 2000

(30) Foreign Application Priority Data

Jan. 29, 1999 (JP) .......................................... 11-021382

(51) Int. Cl.[7] .......................... G02B 13/00; G02B 3/08; G02B 5/18
(52) U.S. Cl. ........................ 359/722; 359/719; 359/721; 359/742; 359/569; 359/570
(58) Field of Search ................ 359/569–571, 359/719, 721, 722, 742, 741, 743; 369/112.06, 112.11

(56) References Cited

U.S. PATENT DOCUMENTS

| | | | | |
|---|---|---|---|---|
| 5,132,843 A | * | 7/1992 | Aoyama et al. | ............. 359/573 |
| 5,696,750 A | * | 12/1997 | Katayama | .................. 369/112 |
| 5,777,803 A | * | 7/1998 | Ju et al. | ..................... 359/719 |
| 5,809,000 A | * | 9/1998 | Choi | ........................... 369/112 |
| 5,914,822 A | * | 6/1999 | Maruyama et al. | ......... 359/743 |
| 6,084,710 A | * | 7/2000 | Katsuma | ..................... 359/569 |
| 6,094,308 A | * | 7/2000 | Katsuma | ..................... 359/569 |
| 6,118,594 A | * | 9/2000 | Maruyama | .................. 359/719 |
| 6,166,854 A | * | 12/2000 | Katsuma | ..................... 359/569 |

FOREIGN PATENT DOCUMENTS

| | | |
|---|---|---|
| JP | 9-145994 | 6/1997 |
| JP | 11-167012 A | * 6/1999 |
| JP | 11-194207 A | * 7/1999 |

* cited by examiner

*Primary Examiner*—Georgia Epps
*Assistant Examiner*—Evelyn A. Lester
(74) *Attorney, Agent, or Firm*—Snider & Associates; Ronald R. Snider

(57) ABSTRACT

A luminous flux diameter variable type objective lens having a wavelength selectivity is disposed within a luminous flux. Arranged on a surface of the lens are a first region 11 with no diffraction gratings, and a second region 12 with diffraction gratings. The diffraction gratings each having a rectangular cross section are linearly arranged in the second region 12. The thickness (height) h of the diffraction grating 12A is set to such a value that the ratio of ± first-order diffracted light becomes much greater for the light having a wavelength of 780 nm used for CD-R, whereas the ratio of zero-order diffracted light becomes substantially 100% for the light having a wavelength of 635 nm used for DVD.

7 Claims, 3 Drawing Sheets

US 6,342,976 B1

LUMINOUS FLUX DIAMETER VARIABLE TYPE OBJECTIVE LENS AND OPTICAL APPARATUS USING THE SAME

RELATED APPLICATIONS

This application claims the priority of Japanese Patent Application No. 11-021382 filed on Jan. 29, 1999, which is incorporated herein by reference.

BACKGROUND OF THE INVENTION

1. Field of the Invention

The present invention relates to a luminous flux variable type objective lens which is composed of a single lens adapted to change the luminous flux diameter according to its wavelength in use, and an optical apparatus using the same; and, in particular, to a luminous flux variable type objective lens capable of reproducing signals from each of a plurality of optical disks for which different wavelengths of irradiation light are used, and an optical apparatus, such as an optical pickup apparatus, using the same.

2. Description of the Prior Art

Optical disks have been in use as various kinds of recording media due to their high recording density, large capacity, excellent random accessibility, and the like.

Hence, there have been known a number of kinds of optical disks such as CD (compact disk), CD-R (recordable compact disk), DVD (digital video disk), LD (laser disk), and the like according to their use or field of application.

Since the optical pickup apparatus have substantially the same configuration for various kinds of optical disks, if a so-called compatible player capable of reproducing signals from various kinds of optical disks is constructed by use of a single pickup apparatus, it will be convenient in that it is unnecessary to prepare various kinds of players for the respective kinds of optical disks.

Meanwhile, the value of numerical aperture NA for each recording medium is defined by a standard. For example, the numerical aperture for DVD is 0.6, thus needing brightness, whereas that of CD-R is 0.45, thus suppressing brightness.

Therefore, if the same objective lens is employed for the recording/reproducing of both of the above-mentioned disks, it will be necessary to switch the numerical aperture of the pickup optical system between their recording/reproducing operations.

The switching between larger and smaller numerical apertures is generally effected by changing the luminous flux diameter. For example, a liquid crystal shutter is driven in synchronization with the timing at which the above-mentioned recording/reproducing operations for the disks are changed over from each other. In this case, however, since the liquid crystal shutter is disposed on the optical path separately from the objective lens, it is contrary to the demand for making the pickup optical system compact. Also, its optical adjustment becomes troublesome. Further, since the light passable through the liquid crystal shutter is required to be polarized, the designing has to be done in view of the direction of vibration of this irradiation light, whereby the degree of freedom in design may be restricted.

Meanwhile, as for the above-mentioned two types of optical recording media, visible light having a wavelength of about 635 nm is used for DVD in order to improve its recording density, whereas near infrared light having a wavelength of about 780 nm is required to be used for CD-R since it is not sensitive to light in the visible region. In view of this fact, there has recently been disclosed a technique in which the difference in wavelength between irradiation light beams is utilized for changing the luminous flux diameters of these two irradiation light beams.

Namely, as one utilizing such a difference between wavelengths of irradiation light in use, there has been known a single lens (Japanese Unexamined Patent Publication No. 9-145994) in which a plurality of regions having curvatures different from each other are concentrically disposed in a lens surface so as to be able to emit luminous fluxes having numerical apertures different from each other.

In such a technique, however, since the lens surface form is complicated, the die for molding the lens becomes expensive, whereby the initial cost before making the lens would increase.

SUMMARY OF THE INVENTION

In view of the foregoing circumstances, it is an object of the present invention to provide a luminous flux variable type objective lens capable of changing the luminous flux diameter of irradiation light according to the wavelength in use without considerably complicating the lens surface form and without increasing the cost of manufacture of the lens molding die, and an optical apparatus using the same.

The luminous flux diameter variable type objective lens in accordance with the present invention is a luminous flux diameter variable type objective lens, disposed within a luminous flux, having a wavelength selectivity;

the objective lens having a first region constituting a center part and a second region positioned outside the center part, the first region having no diffracting action or reflecting action with respect to two light beams having respective wavelengths $\lambda 1$, $\lambda 2$ different from each other, the second region being formed with a diffracting portion or reflecting portion having a diffracting action or reflecting action with respect to only one of the two light beams having respective wavelengths $\lambda 1$, $\lambda 2$.

The diffracting portion may comprise a diffraction grating in which a series of protrusions each having a rectangular cross section are arranged in one direction with a predetermined pitch therebetween.

Alternatively, the diffracting portion may comprise a diffraction grating having a stepped cross section.

The diffraction grating may be made by deposition of titanium dioxide.

The reflecting portion may be constituted by a dichroic reflective film coated on a surface of the lens.

The optical apparatus in accordance with the present invention comprises the luminous flux diameter variable type objective lens in accordance with the present invention.

In the luminous flux variable diameter type objective lens and optical apparatus in accordance with the present invention, a diffracting portion or reflecting portion having a wavelength selectivity is disposed in a peripheral region of the lens, so that only the light whose luminous flux diameter is to be narrowed is not converged in a predetermined converging direction in this diffracting portion or reflecting portion.

Therefore, of the light irradiating the luminous flux diameter variable type objective lens, a wavelength component whose luminous flux diameter is not needed to be narrowed is transmitted therethrough with its original luminous flux diameter, so as to keep the NA of the optical system at a greater value; whereas, as for a wavelength component whose luminous flux diameter is to be narrowed, only its luminous flux portion irradiating the center region of the lens is transmitted therethrough as it is, so as to narrow the luminous flux diameter, thus causing the NA of the optical system to become a smaller value.

As a consequence, the present invention achieved in view of the fact that wavelengths of light employed in individual optical recording media are different from each other is quite effectively applicable to a common optical pickup apparatus for DVD and CD-R, in which the size of NA is needed to be switched. Namely, while substantially utilizing the configuration of the conventional optical pickup apparatus as it is, the luminous flux diameter variable type objective lens in accordance with the present invention having a simple configuration may simply be inserted therein in place of a normal objective lens, so as to switch the NA to the one corresponding to an optical recording medium. Since the die for molding the lens can be made easier than in the above-mentioned prior art, the cost of manufacture can be cut down, whereby the practical value of the present invention is quite high.

DESCRIPTION OF THE PREFERRED EMBODIMENTS

In the following, embodiments of the present invention will be explained with reference to drawings.

Figure 1:
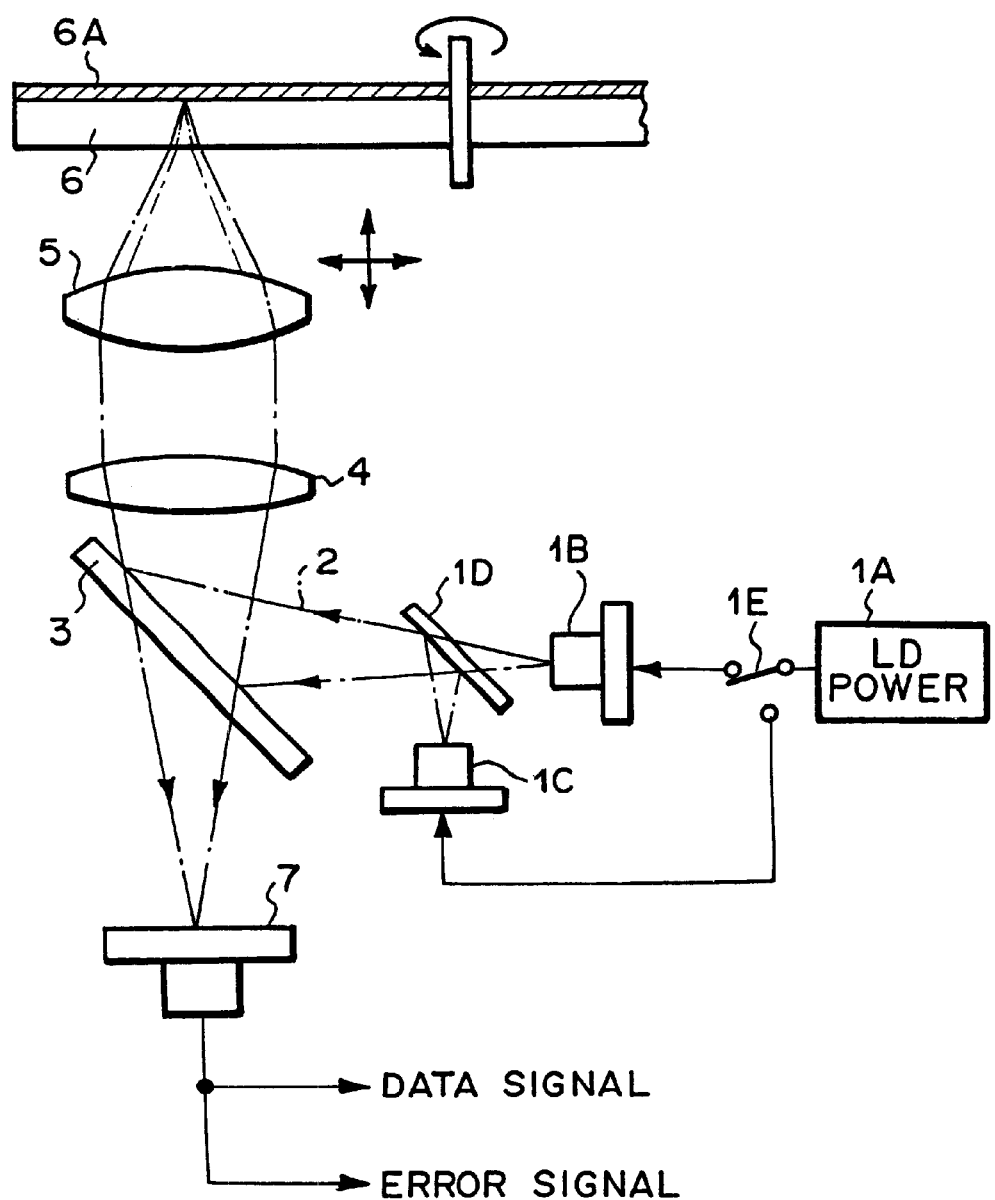
FIG. 1 is a schematic view showing an optical pickup apparatus employing the luminous flux diameter variable type objective lens in accordance with an embodiment of the present invention.

First, referring to FIG. 1, an optical pickup apparatus using the luminous flux diameter variable type objective lens in accordance with an embodiment of the present invention will be explained.

In this optical pickup apparatus, laser beams 2 outputted from semiconductor lasers 1B, 1C as an electric power is supplied thereto from an LD power source 1A are reflected by a half mirror 3, thus reflected light is turned into parallel light by a collimator lens 4, and the parallel light is turned into convergent light by a luminous flux diameter variable type objective lens 5, so as to irradiate a recording area 6A of an optical disk 6. The semiconductor laser 1B is a light source for outputting a laser beam having a wavelength of 780 nm in a near infrared region for CD-R (recordable compact disk), whereas the semiconductor laser 1C is a light source for outputting a laser beam, having a wavelength of 635 nm in a visible region, for example, for DVD (digital video disk). By way of a half mirror 1D, any of laser beams 2 outputted from the semiconductor lasers 1B, 1C irradiates the half mirror 3. A change-over switch 1E is disposed between the LD power source 1A and the semiconductor lasers 1B, 1C, so that the electric power is supplied to any of the semiconductor lasers 1B, 1C as the change-over switch 1E is operated.

On the recording area 6A, pits carrying signal information are arranged in a track form. The reproducing reflected light of the laser beam 2 from the signal recording area 6A, while carrying the signal information, is made incident on the half mirror 3, and then passes through the half mirror 3 so as to enter a four-part photodiode 7. In the photodiode 7, the quantity of light received at each of the four divided diode positions is calculated, so as to yield a data signal and respective error signals for focusing and tracking.

Since the half mirror 3 is inserted in the optical path of the return beam from the optical disk 6 with an inclination of 45°, it acts equally to a cylindrical lens, so that the light beam transmitted through the half mirror 3 has an astigmatism, whereby the amount of error in focusing would be determined according to the form of the beam spot on the four-part photodiode 7. Here, the collimator lens 4 can be omitted according to the circumstances. Further, a grating may be inserted between the semiconductor laser 1B, 1C and the half mirror 3, so as to detect tracking errors by use of three beams.

This optical pickup apparatus is configured so as to be able to record and reproduce signals for any optical disk 6 of CD-R and DVD.

While the geometrical thickness values of CD-R and DVD are standardized at 1.2 mm and 0.6 mm, respectively, focusing can reliably be effected for any optical disk 6 thereof.

Here, each of CD-R and DVD has a protective sheet made of PC (polycarbonate; refractive index $n_D$=1.514).

The respective numerical apertures NA required for the optical system by the above-mentioned CD-R and DVD are different from each other, and are set to 0.45 and 0.6, respectively.

Therefore, in the case where the same objective lens 5 is employed as in this optical pickup apparatus, depending on which of CD-R or DVD is recorded/reproduced, it is necessary to select the NA corresponding to the target recording medium.

Hence, in this optical pickup apparatus, the luminous flux diameter variable type objective lens 5 adapted to narrow the luminous flux diameter of the laser beam from the light source is disposed downstream the collimator lens 4 only when recording/reproducing CD-R, so as to change the NA of the optical system according to the kind of optical disk 6 to be recorded/reproduced.

Figure 2:
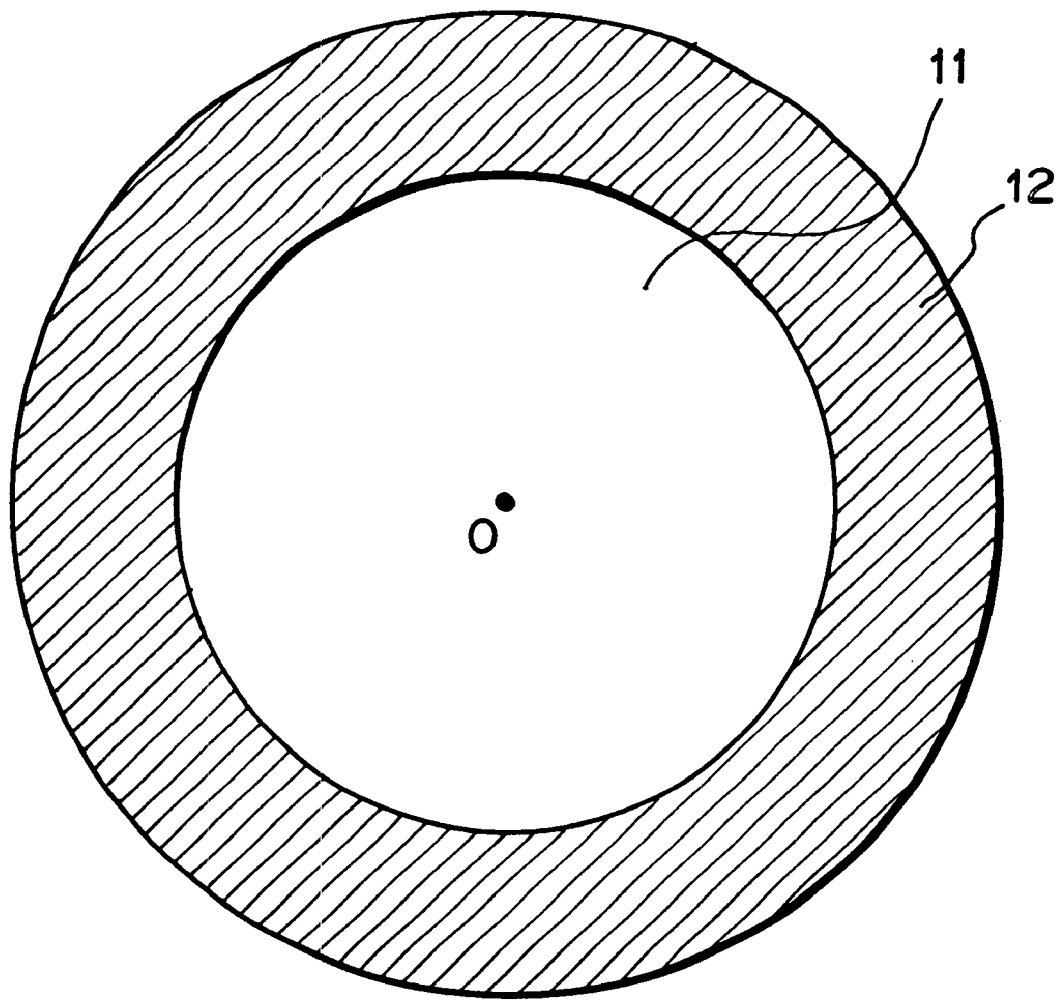
FIG. 2 is a sectional view showing the respective forms of regions of the luminous flux diameter variable type objective lens shown in FIG. 1.

As shown in FIG. 2, the luminous flux diameter variable type objective lens 5 is composed of a first region 11 constituted by a circular center part about a point O on the optical axis, and a second region 12 constituted by its surrounding part. The first region 11 is an area transmitting therethrough any wavelength of light. On the other hand, the second region 12 is an area provided with a diffraction grating having such a wavelength selectivity that light having a wavelength of 635 nm is transmitted therethrough as it is, whereas a major part of light having a wavelength of 780 nm is diffracted sideways.

Figure 3A:
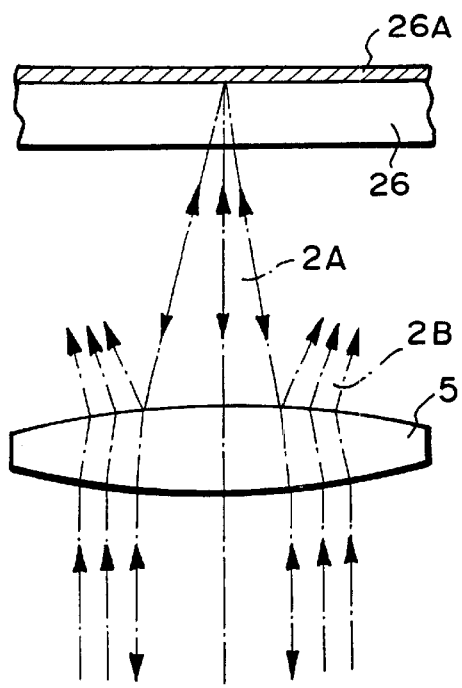
FIGS. 3A and 3B are schematic views for explaining operations of the luminous flux diameter variable type objective lens shown in FIG. 1.

Operations of the luminous flux diameter variable type objective lens 5 will now be explained with reference to FIGS. 3A and 3B. As shown in FIG. 3A, in the case where a CD-R 26 is disposed at a predetermined position (on a turntable) so as to effect recording/reproducing, the laser beam 2 having a wavelength of 780 nm from the semiconductor laser 1B is incident on the luminous flux diameter variable type objective lens 5 while in a substantially parallel state. Here, since the diameter of the incident laser beam 2 is set greater than the diameter of the first region 11 of the luminous flux diameter variable type objective lens 5, the peripheral part of the luminous flux would be incident on the second region 12 of the luminous flux diameter variable type objective lens 5.

Of this light beam, the center luminous flux 2A incident on the first region 11 passes through the luminous flux diameter variable type objective lens 5 as it is, whereas the peripheral luminous flux 2B incident on the second region 12 is diffracted sideways on both sides under the action of the diffraction grating in the second region 12. Therefore, of the laser beam 2, only the part incident on the first region 11 of the luminous flux diameter variable type objective lens 5 effectively contributes to the recording/reproducing in the recording area 26A of the CD-R 26. Thus, the beam diameter is substantially narrowed, whereby the numerical aperture NA decreases.

The diffracting action for light having a wavelength of 780 nm in the second region 12 is such that the ratio of ± first-order diffracted light is much greater than that of zero-order diffracted light.

Figure 3B:
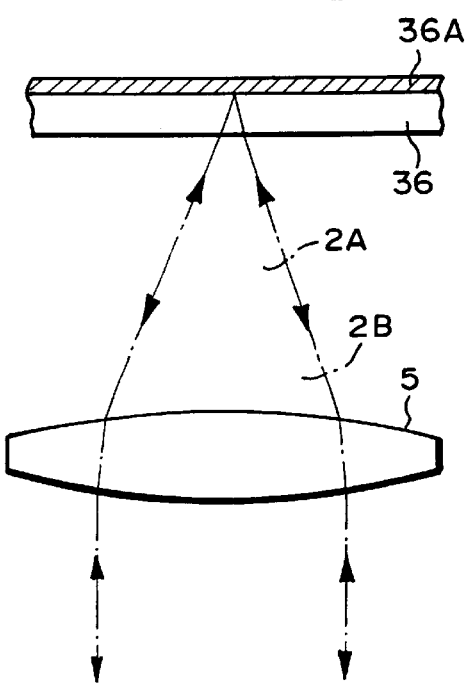

In the case where a DVD 36 is disposed at a predetermined position (on the turntable) so as to effect recording/reproducing as shown in FIG. 3B, on the other hand, the laser beam 2 having a wavelength of 635 nm from the semiconductor laser 1C is incident on the luminous flux diameter variable type objective lens 5 while in a substantially parallel state. Here, even if the diameter of the incident light beam 2 is set greater than the diameter of the first region 11 of the luminous flux diameter variable type objective lens 5, the diffraction grating of the second region 12 does not have a diffracting action for the light having a wavelength of 635 nm (the ratio of zero-order diffracted light being substantially 100%), whereby the peripheral luminous flux 2B passes through the luminous flux diameter variable type objective lens 5 as it is, as with the center luminous flux 2A, whereby the light beam 2 is converged onto the recording area 36A of the DVD 36 without changing its diameter.

The diffracting action for the laser beam having a wavelength of 635 nm in the second region 12 is such that the ratio of zero-order diffracted light is substantially 100%, whereas the ratio of higher-order diffracted light of ± first or higher order is substantially zero.

Figure 4:
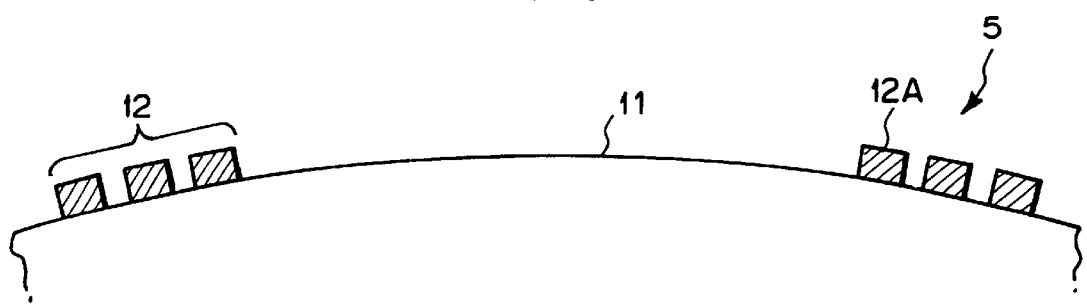
FIG. 4 is a sectional view showing the form of the luminous flux diameter variable type objective lens shown in FIG. 1.

FIG. 4 shows a cross-sectional structure of the above-mentioned luminous flux diameter variable type objective lens 5. Here, on a lens surface, the first region 11 with no diffraction gratings 12A and the second region 12 having diffraction gratings 12A each having a rectangular cross section are shown.

The second region 12 is formed by linearly arranging the depicted diffraction gratings 12A each having a rectangular cross section, while a pitch thereof is set within such a range that a diffraction phenomenon occurs while productivity becomes favorable, e.g., 10 to 20 $\mu m$.

The thickness (height) h of the diffraction grating 12A is set to such a value that the ratio of ± first-order diffracted light becomes much greater for the light having a wavelength of 780 nm used for CD-R, whereas the ratio of zero-order diffracted light becomes substantially 100% for the light having a wavelength of 635 nm used for DVD.

The diffraction grating 12A is formed by depositing titanium dioxide ($TiO_2$) onto the lens surface. The refractive index of titanium dioxide is 2.349 for light having a wavelength of 635 nm and 2.299 for light having a wavelength of 780 nm.

The respective beam diameters of the above-mentioned two wavelengths of laser beams 2 upon incidence on the luminous flux diameter variable type objective lens 5 can be set appropriately as long as they are greater than the diameter of the first region 11.

Without being restricted to the above-mentioned embodiment, the luminous flux diameter variable type objective lens in accordance with the present invention can be modified in various manners. For example, as the material for forming the diffraction grating, various other materials, such as metals, metal oxides, and nonmetals including dielectrics, for example, can be used. Also, the lens and the diffraction grating can be integrally molded with plastics.

The method of forming the diffraction grating is not limited to deposition, and various techniques such as sputtering, plating, roll coating, and the like can be used.

Further, the diffraction grating is not limited to those of rectangular cross section. For example, those having a stepped cross section can be used.

While a diffracting portion having a wavelength selectivity is disposed in the peripheral region (second region) on the surface of the luminous flux diameter variable type objective lens in the above-mentioned embodiment, a reflecting portion adapted to reflect only a predetermined wavelength of luminous flux (light having a wavelength of 780 nm for CD in the above-mentioned embodiment) may be disposed in the peripheral region of the surface in place of the diffracting portion. An example of mode of the reflecting portion is a dichroic metal reflective film formed on the lens surface by deposition. However, as long as a major part of the incident luminous flux can be returned toward the light source, various other modes can be employed. For example, various film-forming techniques such as sputtering, plating, roll coating, and the like can be used in place of the deposition.

Also, while the diffracting portion or reflecting portion is disposed on the surface of the lens on the optical disk side, it may be disposed on the surface of the lens on the light source side as well.

When the present invention is employed in an optical pickup apparatus, the optical recording media subjected to recording/reproducing are not limited to DVD and CD-R. The present invention is applicable to any case where an optical pickup apparatus is commonly used for recording/reproducing two optical recording media whose specifications of wavelength regions in use and NA are different from each other.

What is claimed is:

1. An objective lens having a variable luminous flux diameter, disposed within a luminous flux having a wavelength selectivity;
    said objective lens having a first region constituting a center part and a second region positioned outside said center part, said first region having no diffracting action with respect to two light beams having respective wavelengths $\lambda 1$, $\lambda 2$ different from each other, said second region being formed with a diffracting portion having a diffracting action by a diffracting grating which has a stepped cross section with respect to only one of said two light beams having respective wavelengths $\lambda 1$, $\lambda 2$; and
    wherein luminous flux diameter of one light of the two beams is varied and the other light beam luminous flux diameter is not varied.

2. An objective lens according to claim 1, wherein said diffraction grating is made by deposition of titanium dioxide.

3. An optical apparatus comprising the objective lens having a variable luminous flux diameter according to claim 1.

4. An objective lens according to claim 1, wherein $\lambda 1$ and $\lambda 2$ are 780 nm for CD-R use and 635 nm for DVD use respectively.

5. An objective lens having a variable luminous flux diameter, disposed within a luminous flux having a wavelength selectivity;

said objective lens having a first region constituting a center part and a second region positioned outside said center part, said first region having no diffracting action with respect to two light beams having respective wavelengths $\lambda 1$, $\lambda 2$ different from each other, said second region being formed with a diffracting portion having a diffracting action by a diffracting grating which has a rectangular cross section made by deposition of titanium oxide with respect to only one of said two light beams having respective wavelengths $\lambda 1$, $\lambda 2$; and wherein luminous flux diameter of one of the two light beams is varied and the other light beam luminous flux diameter is not varied.

6. An objective lens having a variable luminous flux diameter, disposed within a luminous flux having a wavelength selectivity;

said objective lens having a first region constituting a center part and a second region positioned outside said center part, said first region having no diffracting action nor reflecting action with respect to two light beams having respective wavelengths $\lambda 1$, $\lambda 2$ different from each other, said second region being formed with a reflecting portion having a wave length selectivity with respect to only one of said two light beams having respective wavelengths $\lambda 1$, $\lambda 2$; and wherein luminous flux diameter of one of the two light beams is varied and the other light beam luminous flux diameter is not varied.

7. An optical apparatus comprising the objective lens having a variable luminous flux diameter according to claim 1.

* * * * *